Figure 1:
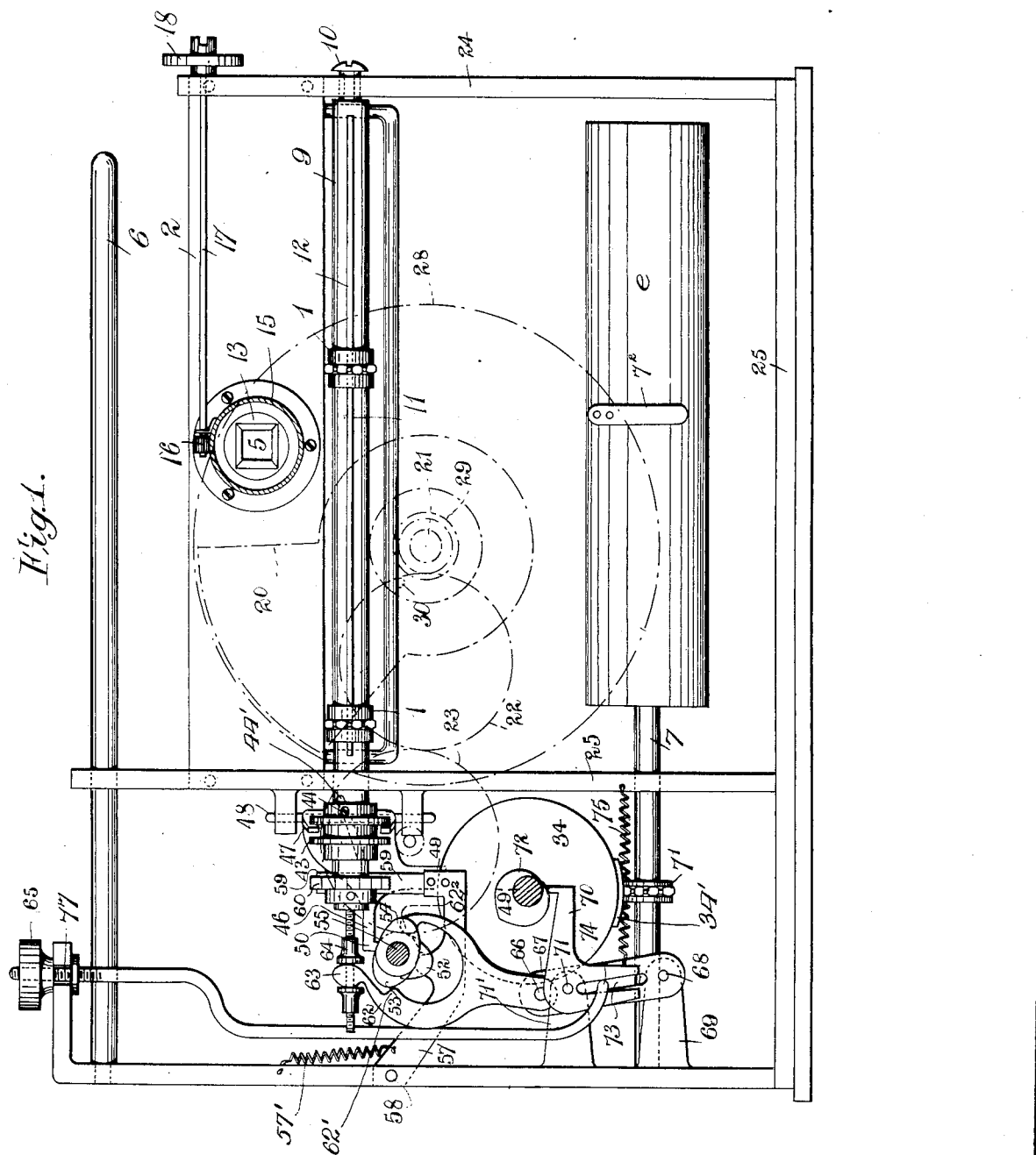

C. DE PROSZYNSKI.
KINEMATOGRAPH CAMERA AND PROJECTING APPARATUS.
APPLICATION FILED JULY 19, 1912.

1,112,555.

Patented Oct. 6, 1914.
3 SHEETS—SHEET 1.

Witnesses:
W. A. Williams
F. Cornwall

Inventor:
C. de Proszynski
per
Attorney.

C. DE PROSZYNSKI.
KINEMATOGRAPH CAMERA AND PROJECTING APPARATUS.
APPLICATION FILED JULY 19, 1912.
1,112,555.
Patented Oct. 6, 1914.
3 SHEETS—SHEET 2.
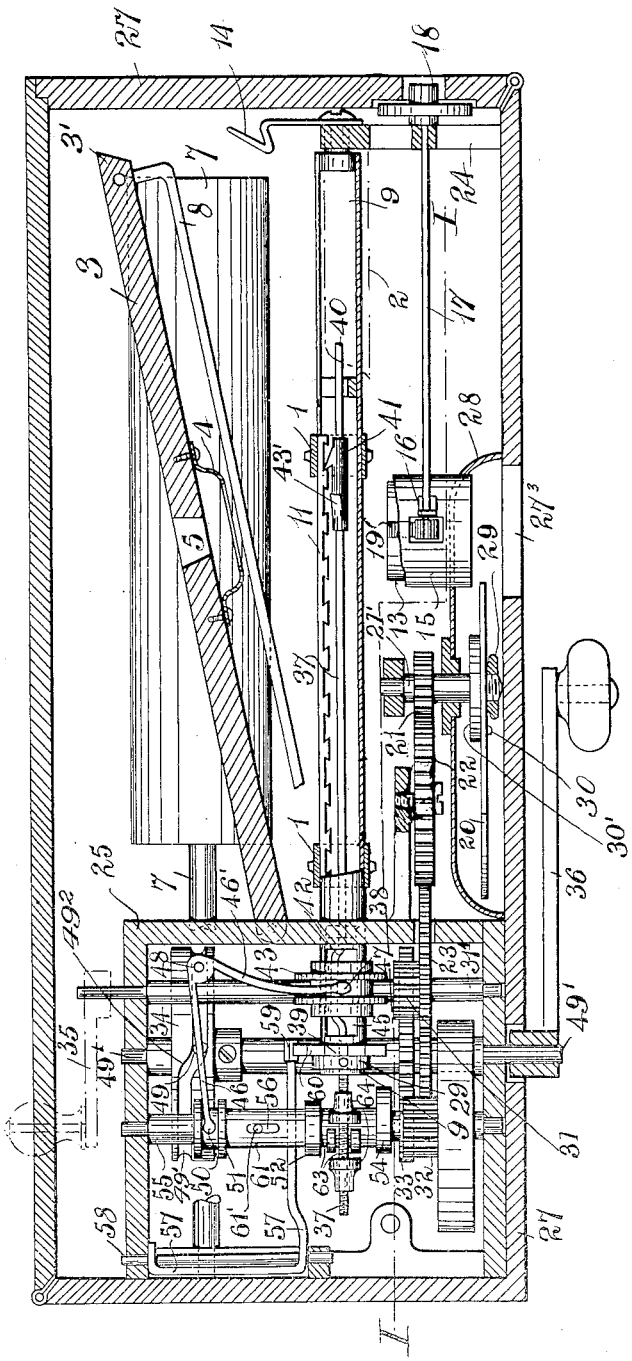
Witnesses:
Inventor:
C. de Proszynski
per
Attorney.

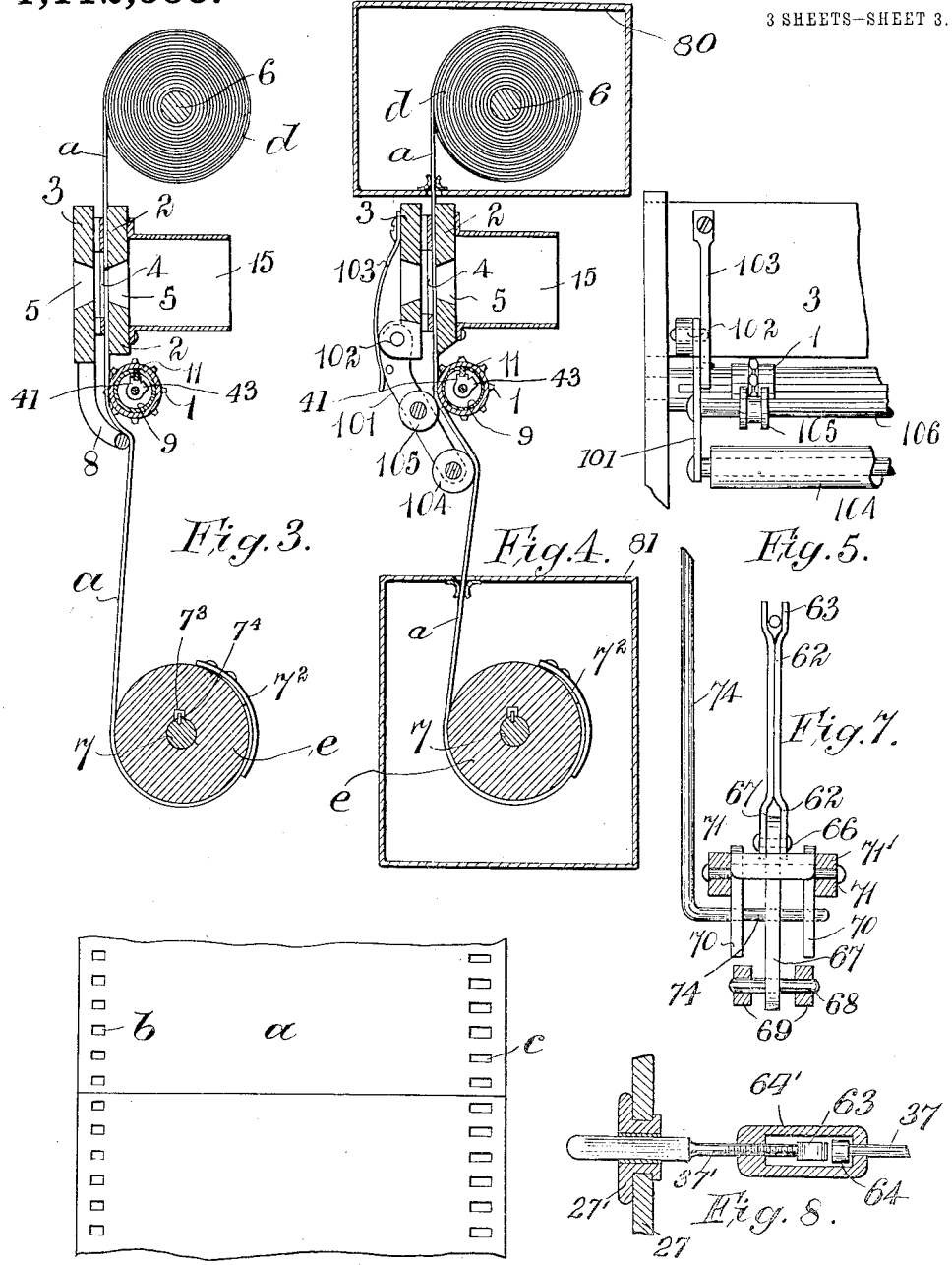

UNITED STATES PATENT OFFICE.

CASIMIR DE PROSZYNSKI, OF LONDON, ENGLAND.

KINEMATOGRAPH CAMERA AND PROJECTING APPARATUS.

1,112,555. Specification of Letters Patent. Patented Oct. 6, 1914.

Application filed July 19, 1912. Serial No. 710,453.

*To all whom it may concern:*

Be it known that I, CASIMIR DE PROSZYNSKI, subject of the Emperor of Russia, residing at London, England, have invented certain new and useful Improvements in Kinematograph Cameras and Projecting Apparatus, of which the following is a specification.

This invention relates to kinematographic cameras and projection apparatus in which a broad film is used, the film being moved intermittently both laterally and longitudinally in order that the pictures photographed are arranged in parallel rows transversely of the film.

The object of the present invention is to provide an improved camera and projection apparatus of the above kind which will work efficiently, and will permit of regulation of the film feeding mechanism, so as to insure accurate registration of the pictures with the lens aperture irrespective of changes in the width of the film due to shrinkage.

In the accompanying drawings: Figure 1, is a sectional elevation of one form of kinematograph apparatus according to the invention, the section being taken on I—I Fig. 2. Fig. 2, is a sectional plan. Fig. 3, is a detail sectional view illustrating the gate and film rolls. Fig. 4, being a similar view of a modification thereof. Fig. 5, is a part rear view corresponding to Fig. 4. Fig. 6, illustrates a piece of film. Fig. 7, is a detail view of regulating mechanism for the film. Figs. 8 and 9 are a sectional view and a side view of a modified form of adjustment for the end of the pawl rod.

In carrying out the invention, according to one form, a broad film $a$, having two series of perforations $b$, and $c$, the perforations of one series being elongated as is known in the art to allow of shrinkage of the film, is passed in the form of a roll $d$, onto a stationary spindle 6, Figs. 1 and 3, so that it is free to slide thereon, and can also be freely unwound therefrom. The film $a$, is passed from the roll $d$, down between two parts 2 and 3, of what is usually called the gate. This comprises a stationary part 2, having an exposure opening 5, therein, and a hinged part or gate proper 3, also having an exposure opening 5, and fitted with a spring pad 4, which gently presses the film $a$, against the stationary part 2, when the hinged gate 3, is moved into the proper closed position with its end 3', in engagement with the spring catch 14, Fig. 2. The hinged gate 3, has a bent wire guard 8, over which the film $a$, is passed on its way to a spool $e$, mounted on a rotary spindle 7, the end of the film being clipped on to the spool $e$, by a clip $7^2$. The spool $e$, is free to slide on the spindle 7, but is caused to rotate therewith, for the purpose of allowing the film $a$, to move laterally, as well as longitudinally as hereinafter explained. To permit of this relation between the spool and its spindle 7, the spool is provided with a key-way $7^3$, and the spindle 7, is provided with a key $7^4$, the key being a loose fit in the key-way $7^3$. The perforations $b$, and $c$, in the film $a$, are engaged by the teeth of sprocket pinions 1, which are mounted on a tubular shaft 9. The tubular shaft 9, is provided with a slot 12, Fig. 1, in which the rack 11, slides, the rack 11, being connected to the pinions 1, Fig. 2, so that the pinions 1, can slide longitudinally along the tubular shaft 9, but are obliged to rotate together with said shaft.

The rack 11, is provided with two sets of ratchet teeth of opposite hand, the teeth of one hand alternating with the teeth of the other hand, as clearly shown in Fig. 2. A pawl rod 37, situated within the tubular shaft 9, is provided with two pawls 41', 43', also of opposite hand. The pawls are set apart as shown in Fig. 2, and are angularly displaced as shown in Fig. 3, so that only one pawl can be in operative position at a time to engage with the rack 11. When the film is to be fed from left to right the rod 37, is first rotated so as to bring the pawl 43, into operative position to engage with the corresponding set of teeth in the rack 11, the other pawl 41, being thereby moved into an inoperative position; whereas when a feed from right to left is required, the pawl rod 37, is first rotated to bring the pawl 41, into operative position and the pawl 43, into an inoperative position. The pawl rod 37, which is free at the end 40, passes through two bearings, 38, 29 in the left hand end of the tubular shaft 9. It is left free at the end 40, so that it can spring away from the rack 11, when either of the pawls 41, 43, is engaging with the rack 11, but is on its return stroke and therefore slipping over the tooth with which it is in contact. The opposite end of the rod 37, is fitted with two adjustable collars 64, 64, screwed thereon and adapted to be engaged with the forked end 63, of a lever 62, Figs. 1 and 2.

The lever 62, is pivoted at 66, to a lever 67, which in turn is pivoted at 68, to a stationary bracket 69. The lever 62, is forked and thereby provided with two abutment surfaces 62', and 62², Fig. 1, which are adapted to be engaged by either of two cams 53 and 54, according to which cam is brought into operative position opposite to the lever. One cam 53, is brought into the operative position when the film is to be moved from left to right and the other when it is to be moved from right to left, the cams being set at 180° apart. The third cam 52, is intended to depress a lever 57, pivoted on a rod 58, Figs. 1 and 2, the lever 57, being provided with a spring pawl 59, adapted to engage a toothed wheel 60, mounted on the tubular shaft 9, for the purpose of imparting to the said shaft the requisite rotary movement for shifting or feeding the film longitudinally through the medium of the pinions 1. The lever 57, is returned to its normal position after each depression, by means of a spring 57', Fig. 1. The three cams 52, 53, 54, are mounted on or formed in one piece with a sleeve 61, Fig. 2, which is free to slide on a shaft 55, but is caused to rotate therewith, for instance, by a pin 61', which passes through the shaft 55, and enters a slot 56, in the sleeve 61. The sleeve 61, is provided with a collar 51, which is engaged by a lever 46, which is pivoted at 48, and has a pin 49, on it which enters the cam slot 49', in a wheel 34, on the rotation of which the lever 46, is oscillated periodically and reciprocates the sleeve 61, so as to bring the cams 53, 54 alternately into and out of engagement with the lever 62. The reciprocation of the sleeve 61, also brings the cam 52, into and out of engagement with the lever 57. The lever 46, has another arm 46', which is forked at its end 47, and the forked end 47, engages with a collar 43, capable of sliding on the tubular shaft 9. The collar 43, has a pin 44, Fig. 2, which engages in a helical slot 44', in the shaft 9, so that it is caused to rotate in relation to said shaft when it slides thereon, under the action of the lever 46. The pawl rod 37, has a crank part 42, which passes through a wide slot 45, in the tubular shaft 9, Fig. 2, and fits in a slot in the bore of the collar 43, so that when the said collar is rotated, as just described, it rotates the pawl rod 37, sufficiently to move one of the teeth 41, or 43, into engagement with the rack 11, and the other tooth out of engagement therewith.

The wheel 34, is mounted on a shaft 49', adapted to be rotated by a handle 36. A gear wheel 33, on the shaft 49', meshes with a pinion 32, on the shaft 55, and thereby rotates said shaft which carries the cams 52, 53, 54, before referred to. The wheel 33, also meshes with a pinion 31, on a shaft 31', on which is mounted a wheel 23, which meshes with a wheel 22, that drives a pinion 21, on the spindle 21', of the shutter 20. The shutter 20, is clamped on the spindle 21', by means of a nut 29, and is also prevented from moving relatively to said spindle by means of a pin 30, carried by a boss 30', the pin passing through a suitable perforation in the shutter 20. The shutter 20, rotates within a metal cap 28 mounted within the main casing 27, so that it is entirely protected. A tube 15, projects through the cap, and an opening 27³, is provided in the casing 27, opposite to said tube 15, which is fitted with a pinion 16, operable by a rod 17, fitted with a slotted head 18, so that it can be easily rotated by a coin or screw driver in order to focus the lens which is carried in a tube 13, telescoping in the tube 15, and having a rack 19, adapted to be engaged by the pinion 16. The tube 15, is mounted upon the stationary portion 2, of the gate as shown in Fig. 3. If desired, the shaft 31', may be fitted with a handle 35, in place of the handle 36. The wheel 34, is provided with a tooth 34', Fig. 1, which drives a toothed wheel 7', on a spindle 7, of the spool e, so that the spool is intermittently rotated at the same time that the pinions 1, are rotated.

The mechanism so far described is sufficient for the taking of photographs, that is to say, I have so far described the camera, and its general operation may be summarized as follows:—Assuming the parts of the mechanism to be in the position shown in the drawings, except that the movable gate proper 3, is in its closed position shown in Fig. 3, and not in its open position shown in Fig. 2, the pawl 41, has just finished a series of reciprocations which through the medium of the rack 11, have moved the pinions 1, from an extreme position at the right to an extreme position to the left. The mechanism is shown just on the point of change. Rotation of the handle 36, will cause the shaft 49', to rotate and therefore, the rotation of the wheel 34 thereon. The curved part 49² of the cam slot 49', in the wheel 34, is just about to receive the pin 49, and therefore, the lever 46, is just about to move the sleeve 61, on its shaft 55. When this occurs the cam 52, will be brought over the lever 57, and the cam 53, which in Fig. 1, is shown in engagement with the lever 62, will be moved away therefrom and the cam 54, will be moved into engagement therewith. At the same time that this change of the positions of the cams will take place the arm 46', of the lever 46, will slide the collar 43 along the tubular shaft 9, and the collar 43, owing to the pin 44, and slot 44', will receive a slight rotary motion, which will partly rotate the pawl rod 37, relatively to the tubular shaft 9, through the medium of the crank portion 42. This partial rotation of the pawl rod 37, will bring the pawl 43, into engagement with the rack 11, and the pawl 41, out of engagement therewith. The parts will thus be in position ready to begin a step-by-step movement of the pinions 1, and therefore of the film from the left to the right, but before this occurs a longitudinal feeding movement of the film is necessary by the amount equal to the depth of another picture. It will be understood that while the shaft 49' is rotating, the shaft 55, is also being rotated by the medium of the wheels 33, 32, so that the cam 54, will be brought into a suitable position to pass between the abutments 61', 62², of the lever 62, when the sleeve 61, is being slid along the shaft 35. The continued rotation of the shaft 55, will cause the cam 52, to depress the lever 57, and through the medium of the spring pawl 59, and ratchet wheel 60, to rotate the tubular shaft 9, and therefore, the pinions 41, thereon, thereby effecting the necessary longitudinal feeding movement of the film. When this has been completed the cam 54, will continue to oscillate the lever 62, and the latter by means of its forked end 63, and the collar 64, will reciprocate the pawl rod 37. This reciprocation will continue until the pawl 43, has engaged sufficient teeth in the rack 11, to have moved the film step by step from extreme position on the left to its extreme position on the right. By the time that this has been effected the cam wheel 34, will have made a half revolution so that a curved part in the cam slot 49', similar to the curved part 49², but on the opposite side of the wheel 34, will have reached the pin 49, ready to move the lever 46, in an opposite direction to slide the sleeve 61, so as to move the cam 53, into operative position, with regard to the lever 62, and the cam 54, out of its operative position. It will at the same time bring the cam 52, again over the lever 57, and also slide the collar 43 through the medium of the arm 46', so that the pawl 43', will be brought out of engagement with the rack 11, and the pawl 41, into engagement, and moreover, so that the continued rotation of the shaft 55, will, through the medium of the cam 52, and lever 57, the pawl 59, and ratchet wheel 60, again rotate the tubular shaft 9, and pinions 1, to impart a further longitudinal movement to the film. It will be understood that the cam 52, is never over the lever 57, while either of the cams 53, or 54, is opposite to the lever 62, but that it is over the lever 57, and effects the depression thereof during the change of positions.

Briefly stated the operation of the mechanism consists in: (a). The reciprocation of the pawl rod 37, to effect a step by step movement of the pinions 1, carrying the film, first from left to right and then from right to left. (b). The intermittent rotation of the tubular shaft and pinions 1, during the change of the step by step motion of the film in one direction, to that in the other, so as to effect the necessary longitudinal feed of the film to expose a fresh lateral strip of film for another row of pictures. (c). The intermittent rotary movement of the pawl rod 37, relatively to the tubular shaft 9, before each change in the step by step movement, in order to bring one pawl into engagement and the other pawl out of engagement with the rack connected to the two pinions. As any slight inaccuracy or lost motion between the pawls 41, and 43', and the teeth of the rack 11, might lead to want of registration, between the first picture of a row and the last of the preceding row on the film, the pawl rod 37, is provided with adjustable collars 64, as shown in Figs. 1 and 2. If the right hand collar 64, be adjusted once and for all, it may be regarded as fixed relatively to the pawl rod 37. Thus, the extreme position of the pawl rod 37, to he right at the end of each stroke will be determined. Any adjustment of the left hand collar 64, will increase or decrease the lost motion between the end 63, of the lever 62, and the said collar so that by adjusting it, the extreme position of the pawl rod 37, in its strokes to the left can be varied. A more convenient arrangement, operable from outside the camera casing is shown in Figs. 8 and 9, and comprises one collar 64, fixed on the shaft 57, once and for all in its proper position. A slotted sleeve 641, receives the end 63, of the lever 62, which end need not be forked as in the previous example described. The sleeve 641, also receives an adjusting screw 371. The screw 371 passes through a bush 271 in the wall of the casing 27, and can thus be operated from outside. If the screw 371, be rotated so that it is screwed outwardly the lost motion or clearance between it and the end 63, of the lever 62, will be increased. If it be screwed inwardly the lost motion or clearance will be decreased. The length of stroke of, and the extreme position of the pawl rod 37, to the left can thus be varied as required.

The mechanism so far described, will suffice, so far as the use of the apparatus as a camera is concerned, but as it is desirable that the same apparatus shall be usable as a projecting apparatus some adjustment must be provided to allow for shrinkage of the film during development. When a negative film is developed a positive film is obtained from it and developed and this positive is used for projection purposes. When it shrinks all the pictures shrink in proportion, consequently unless some adjustment is provided the pictures will not register with the exposure opening, and the registration will get worse as the row of pictures progresses step by step or picture by picture across the said opening. Moreover as the teeth of the rack 11, are of a determined pitch, a mere variation in the stroke of the pawl rod will not suffice, for if the stroke of the pawl be merely shortened that is, made less than the pitch of the rack teeth, it will fail to engage with the next tooth on each return stroke. On the other hand if the stroke be merely increased so that it exceeds the pitch of the rack teeth it will move beyond the next tooth on each return stroke and there will be a period of idle motion so that the actual or effective movement of the rack will remain equal to the pitch. To meet this difficulty I provide means, which will retard or accelerate the movement of the pawl while it is actually in engagement with the rack teeth, the amount of retardation or acceleration being such that the effective stroke of the pawl is altered by an amount equal to the displacement of the first picture due to the aforesaid shrinkage. The movement of the pawl is retarded during the step by step movement of the film in one direction and accelerated during the movement in the opposite direction.

The means for retarding and accelerating the movement of the pawl is made adjustable so that the degree of retardation and acceleration may be varied to suit the particular film being passed through the apparatus. These means comprise a pivot 66 for the lever 62, Fig. 1, which is not stationary but one which moves gradually and uniformly to the left or to the right accordingly as the pinions 1, and film thereon are being moved step by step to the right or left. To effect this oscillation of the pivot 66, it is carried by a lever 67, pivoted on a pin 68, carried by stationary brackets 69, Figs. 1 and 5.

A pair of levers 70, preferably formed in one piece, are mounted on pins 71, in stationary brackets 71'. The lever 67, has a slot 73, and the lower arms of the levers 70 are also slotted. A rod 74, passes through these slots, the wire being bent and extended upwardly to a bracket 77, where it is fitted with a nut 65, which will allow the rod 74, to swing slightly and which can also be rotated to raise or lower the rod 74, in the slot 73. A spring 75, constantly pulls the lever 67, and therefore, the levers 70, toward a cam 72, mounted in the shaft 49. The cam 72, has a uniform rise and fall. It makes half a revolution while the pinions 1, and therefore, the film makes a complete step by step movement or travel from left to right and another half while they make a complete travel from right to left. If the rod 74, is drawn right up to the top of the slot 73, the effect of the cam 72, on the lever 67, and therefore, the amplitude of oscillation of the pivot 66, will be negligible, and this is the case when the apparatus is used as a camera. But as the wire 74, is lowered so will the effect of the cam on the lever 67, and therefore the amplitude of the oscillation of the pivot 66, be increased. The lever 67, will oscillate and the pivot 66, will make one movement to the right or left for each complete lateral step by step travel of the pinions 1, and film thereon. The result will be that the effective movement or step of the pawl rod 37, will increase while the pinions 1, are being moved step by step in one direction and will decrease while they are being moved in the opposite direction. As the cam 72, has a uniform rise and fall the increase and decrease will be uniform.

Should the pictures of a film be found to be out of register with the lens aperture, then the nut 65, can be rotated until the required adjustment has been effected. In a modification, the film, as illustrated in Figs. 4 and 5, the film a, is pressed against the pinions 1, by means of grooved rollers 105, freely mounted on a rod 106, so that they can slide thereon and follow the pinions 1, as the said pinions are travelled step by step in one direction or the other. The rod 106, is carried by end levers 101, each pivoted to a pin 102, and acted upon by a spring 103, so that the rollers 105, are pressed lightly against the pinions 1. A guide roller 104, is also carried by the levers 101, the film passing from the pinions 1, thence over the roller 104, to the spool e.

In a modification the sprocket pinions may be above the gate instead of below it.

It will be understood that in the example illustrated the whole mechanism is mounted in one framework inclosed in the camera casing. If desired, the film cam be contained in a box 80, and after passing through the gate can pass into another box 81, as shown in Fig. 4 these boxes being removable from the main casing to allow for daylight loading and unloading. It will be obvious that the rod 37 could connect the pinions 1, and the rack could then be reciprocated.

I claim:

1. In combination in a kinematograph apparatus having a lens and means for carrying a film, said film carrying means comprising rotary film feeding members, rack and pawl mechanism for moving said film carrying means step-by-step across the lens first in one direction, and then step-by-step across the lens in an opposite direction, and means for rotating said rotary film feeding members during the change from the step-by-step movement in one direction to the stepby-step movement in the other direction, substantially as and for the purpose hereinbefore set forth.

2. A kinematograph apparatus for use with a perforated film comprising a lens and means for intermittently feeding the film relatively to said lens both laterally and longitudinally consisting of sprocket pinions engaging in the perforations of the film, rack and pawl mechanism for intermittently moving said pinions parallel to their axes of rotation, and means for intermittently rotating said pinions, substantially as and for the purpose hereinbefore set forth.

3. A kinematograph apparatus for use with a film, comprising a lens and means for intermittently feeding a film both laterally and longitudinally relatively to said lens, consisting of a plurality of sprocket pinions, a shaft on which said pinions are slidably mounted, a rack connecting said pinions together, a rod having pawls for engaging said rack, means for reciprocating said rod, and means for intermittently rotating the aforesaid shaft and pinions substantially as and for the purpose hereinbefore set forth.

4. A kinematograph apparatus for use with a film, comprising a lens and means for intermittently feeding a film both laterally and longitudinally relatively to said bars, consisting of a plurality of sprocket pinions, a shaft on which said pinions are slidably mounted, a rack connecting said pinions together, a rod having pawls for engaging said rack, said pawls being angularly displaced and being of opposite hand, means for reciprocating said rod, means for intermittently rotating said rod for the purpose of bringing one of said pawls into engagement with the rack and disengaging the other, and means for intermittently rotating the aforesaid shaft and pinions thereon, substantially as and for the purpose hereinbefore set forth.

5. A kinematograph apparatus for use with a film, comprising a lens and means for intermittently feeding a film both laterally and longitudinally relatively to said lens, consisting of a plurality of sprocket pinions, a shaft on which said pinions are slidably mounted, a rack connecting said pinions together, a rod having pawls for engaging said rack, said pawls being angularly displaced and being of opposite hand, means for reciprocating said rod comprising cams and a pivoted lever, means for intermittently rotating said rod and means for intermittently rotating the aforesaid shaft and pinions thereon, substantially as and for the purpose hereinbefore set forth.

6. A kinematograph apparatus for use with a film, comprising a lens and means for intermittently feeding a film both laterally and longitudinally relatively to said lens, consisting of a plurality of sprocket pinions, a shaft on which said pinions are slidably mounted, a rack connected with said pinions, said rack having two sets of teeth of opposite hand, a rod having two pawls for engagement with said teeth, said pawls being angularly displaced whereby one is in engagement at a time, means for reciprocating said rod, means for intermittently rotating the rod whereby to change the engagement of the pawls with the rack, and means for intermittently rotating the aforesaid shaft, comprising a toothed wheel on said shaft, a spring pawl therefor, a pivoted lever carrying said pawl and a cam for intermittently depressing said levers, substantially as hereinbefore set forth.

7. A kinematograph apparatus for use with a film, comprising a lens and means for intermittently feeding a film both laterally and longitudinally relatively to said lens, consisting of a plurality of sprocket pinions, a shaft on which said pinions are slidably mounted, a rack connected with said pinions, said rack having two sets of teeth for engagement with said teeth, said pawls being angularly displaced whereby one is in engagement at a time, cams for reciprocating said rod, a cam for intermittently rotating the aforesaid shaft and means for moving the aforesaid cams into and out of their operative positions and for simultaneously effecting the rotation of the aforesaid pawl and rod, substantially as and for the purpose hereinbefore set forth.

8. A kinematograph apparatus for use with a film, comprising a lens and means for intermittently feeding a film relatively to said lens, both laterally and longitudinally, comprising sprocket pinions for engaging said film, means for moving said pinions intermittently parallel to their axes whereby to move said film progressively back and forth across the lens, means for rotating said pinions intermediate of each backward and forward movement for the purpose of exposing a fresh portion of film to the lens, and means for varying the intermittent movement of the pinions parallel to their axes, substantially as and for the purpose hereinbefore set forth.

9. A kinematograph apparatus for use with a film, comprising a lens and means for feeding said film relatively to said lens both laterally and longitudinally consisting of a pair of sprocket pinions for engaging a film, a shaft for rotating said pinions, a rack connected to said pinions, a rod having pawls of opposite hand for engaging said rack, said pawls being angularly displaced, means for intermittently rotating said rod to bring one of said pawls into engagement with the rack, a pivoted lever operatively connected to said rod for moving the same back and forth, two rotary cams for oscillating said lever, means for bringing either of said cams into operative position relatively to said lever, means for constantly oscillating the pivot of said lever at a uniform rate, and independent means for varying the amplitude of oscillation of said pivot, substantially as and for the purpose hereinbefore set forth.

10. A kinematograph apparatus for use with a film comprising a lens and means for intermittently feeding the film both laterally and longitudinally relatively to said lens, consisting of a plurality of sprocket pinions, a shaft on which said pinions are slidably mounted, means for moving said pinions step-by-step along said shaft comprising co-acting elements consisting of a rack and a rod having pawls for engaging said rack, one of said elements being mounted inside said shaft.

11. A kinematograph apparatus for use with a film, comprising a lens and means for intermittently feeding a film both laterally and longitudinally relatively to said lens, consisting of a plurality of sprocket pinions, a shaft on which said pinions are slidably mounted, a rack connected with said pinions, pawls for engaging said rack, means for giving said pawls a backward and forward movement, means for decreasing the step of the pawls during the movement of the sprocket pinions in one direction longitudinally and means for increasing the step of the pawls during the movement in the opposite direction.

12. A kinematograph apparatus for use with a film, comprising a lens and means for intermittently feeding a film both laterally and longitudinally relatively to said lens, consisting of a plurality of sprocket pinions, a shaft on which said pinions are slidably mounted, a rack connected with said pinions, pawls for engaging said rack, means for giving said pawls a backward and forward movement, means for decreasing the step of the pawls during the movement of the sprocket pinions in one direction longitudinally, means for increasing the step of the pawls during the movement in the opposite direction, comprising a pivotal lever, and a cam for reciprocating said pawls, the pivot of the said lever being movable backward or forward relatively to the longitudinal axis of the aforesaid shaft.

13. A kinematograph apparatus for use with a film comprising a lens and means for intermittently feeding a film both laterally and longitudinally relatively to said lens, consisting of a plurality of sprocket pinions, a shaft on which said pinions are slidably mounted, a rack connected with said pinions, pawls for engaging said rack, means for giving said pawls a backward and forward movement, means for decreasing the step of the pawls during the movement of the sprocket pinions in one direction longitudinally, means for increasing the step of the pawls during the movement in the opposite direction and means adjustable by hand during operation of the apparatus for increasing or decreasing the step of the said sprocket longitudinally on the shaft.

14. A kinematograph apparatus for use with a film, comprising a lens and means for intermittently feeding a film both laterally and longitudinally relatively to said lens consisting of a plurality of sprocket pinions, a shaft on which said pinions are slidably mounted, a rack connected with said pinions, pawls for engaging said rack, means for giving said pawls a backward and forward movement, means for decreasing the step of the pawls during the movement of the sprocket pinions in one direction longitudinally, means for increasing the step of the pawls during the movement in the opposite direction comprising a pivoted lever, a cam for reciprocating said pawls, the pivot of the said lever being movable backward or forward relatively to the longitudinal axis of the aforesaid shaft, and a cam moving the said pivot.

15. A kinematograph apparatus for use with a perforated film comprising a lens and means for intermittently feeding the film relatively to said lens both laterally and longitudinally, consisting of sprocket pinions engaging in the perforations of the film, guide rollers in juxtaposition to said sprocket pinions a rod on which said rollers are free to slide, the said rod being supported by pivoted levers, means for intermittently moving said pinions parallel to their axes of rotation, and means for intermittently rotating said pinions, substantially as and for the purpose hereinbefore set forth.

16. A kinematograph apparatus for use with a film comprising a lens and means for intermittently feeding a film both laterally and longitudinally relatively to said lens, consisting of a plurality of sprocket pinions, a shaft on which said pinions are slidably mounted, a rack connecting said pinions together, a rod having pawls for engaging said rack means for reciprocating said rod for giving the backward and forward movement, means for increasing or decreasing the said movement, and means for intermittently rotating the aforesaid shaft and pinions substantially as and for the purpose hereinbefore set forth.

17. A kinematograph apparatus for use with a film, comprising a lens and means for intermittently feeding a film both laterally and longitudinally relatively to said lens, consisting of a plurality of sprocket pinions, a shaft on which said pinions are slidably mounted, means for intermittently rotating said shaft and pinions, a rack connecting said pinions together, a rod having pawls for engaging said rack, an oscillatory lever adapted to engage the pawl rod to move it in one direction, a member carried by the pawl rod and adapted to be engaged by the said oscillatory lever to move the pawl rod in the opposite direction, said member being adjustable in relation to the oscillatory lever for the purpose of varying the clearance between it and the said lever, substantially as and for the purpose hereinbefore set forth.

18. A kinematograph apparatus for use with a film, comprising a lens and means for intermittently feeding a film both laterally and longitudinally relatively to said lens, consisting of a plurality of sprocket pinions, a shaft on which said pinions are slidably mounted, means for intermittently rotating said shaft and pinions, a rack connecting said pinions together, a rod having pawls for engaging said rack, a slotted sleeve mounted on said pawl rod adjacent to the end thereof, a screw passing through the end of said sleeve, remote from the end of the pawl rod, an oscillatory member adapted to oscillate between said screw and the end of said pawl rod, and means operable from outside the apparatus for rotating said screw for the purpose hereinbefore set forth.

In testimony whereof I have signed my name to this specification in the presence of two subscribing witnesses.

CASIMIR de PROSZYNSKI.

Witnesses:
 A. R. MOODY,
 W. E. SALES.